(12) United States Patent
Axén et al.

(10) Patent No.: US 10,412,768 B2
(45) Date of Patent: Sep. 10, 2019

(54) METHOD AND DEVICES OF PERFORMING A RANDOM ACCESS PROCEDURE BETWEEN A USER EQUIPMENT, UE, AND A RADIO ACCESS NETWORK OF A TELECOMMUNICATION NETWORK

(71) Applicant: Telefonaktiebolaget LM Ericsson (publ), Stockholm (SE)

(72) Inventors: Rasmus Axén, Linköping (SE); Mehdi Amirijoo, Linköping (SE); Håkan Axelsson, Linköping (SE); Walter Müller, Upplands Väsby (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 15/524,171

(22) PCT Filed: Nov. 9, 2016

(86) PCT No.: PCT/EP2016/077100
§ 371 (c)(1),
(2) Date: May 3, 2017

(87) PCT Pub. No.: WO2018/086681
PCT Pub. Date: May 17, 2018

(65) Prior Publication Data
US 2018/0302928 A1    Oct. 18, 2018

(51) Int. Cl.
*H04L 12/28* (2006.01)
*H04W 74/08* (2009.01)
(Continued)

(52) U.S. Cl.
CPC ..... *H04W 74/0833* (2013.01); *H04W 74/006* (2013.01); *H04W 74/008* (2013.01); *H04B 7/022* (2013.01)

(58) Field of Classification Search
CPC .................. H04W 74/008; H04W 74/0833
(Continued)

(56) References Cited

U.S. PATENT DOCUMENTS

2012/0046065 A1  2/2012  Amirijoo et al.
2013/0279430 A1* 10/2013  Damnjanovic ......... H04W 8/22
370/329
(Continued)

*Primary Examiner* — John Pezzlo
(74) *Attorney, Agent, or Firm* — Murphy, Bilak & Homiller, PLLC

(57) ABSTRACT

Method of performing a random access procedure between a User Equipment, UE, and a radio access network, wherein two access nodes comprise different sets of signature sequences, wherein said signature sequences are used, by said access nodes, to differentiate requests coming from different UEs, said method comprising the steps of receiving a random access request from said UE, wherein said random access request comprises a signature sequence, determining that said random access request is intended for said first radio access node based on said signature sequence comprised by said request, receiving, from a second access node, said random access request, thereby indicating that said second radio access node has also received said random access request from said UE, and sending a response based on said received random access request from said UE and based on said random access request received from said second radio access node.

20 Claims, 6 Drawing Sheets

(51) Int. Cl.
*H04W 74/00* (2009.01)
*H04J 1/16* (2006.01)
*H04B 7/022* (2017.01)

(58) Field of Classification Search
USPC .............................. 370/252, 329, 278, 386
See application file for complete search history.

(56) References Cited

U.S. PATENT DOCUMENTS

2014/0293776 A1 10/2014 Yang et al.
2019/0098672 A1* 3/2019 Murray ................ H04B 7/0695

* cited by examiner

METHOD AND DEVICES OF PERFORMING A RANDOM ACCESS PROCEDURE BETWEEN A USER EQUIPMENT, UE, AND A RADIO ACCESS NETWORK OF A TELECOMMUNICATION NETWORK

TECHNICAL FIELD

The present invention is generally related to radio access networks, more specifically to the act of performing a random access procedure between a User Equipment, UE, and a radio access network comprising two access nodes.

BACKGROUND

A radio access network, RAN, is the part of a mobile telecommunication system that is responsible for connecting User Equipment, UEs, to the core network. The radio access network implements a certain radio access technology, such as third generation, 3G, fourth generation, 4G, and Long Term Evolution, LTE.

Different types of radio access network exist. For example, the Universal Terrestrial Radio Access Network, UTRAN, is a term used for the network and equipment that connect UE's to the public internet. The UTRAN comprises base stations which are referred to as Node B's and Radio network controllers. Another example is the Evolved Universal Terrestrial Radio Access Network, E-UTRAN, which is initially meant as a replacement of the Universal Mobile Telecommunications System, UMTS. An Evolved Node B is the element in the E-UTRAN that is the evolution of the Node B in the UTRAN access network.

A random access procedure is typically used by User Equipment, UEs, to initiate a data transfer. Such a random access procedure is used to synchronize the UE towards the base station, i.e. from the UE towards an access node of the radio access network, i.e. the eNodeB or the node B.

When performing random access in the Long Term Evolution, a UE sends a specific pattern or signature called RACH preamble sequence. The sequence is derived from a root sequence and some transform that is broadcasted by the radio base station. This creates a number of possible preamble sequences that can be used towards this base station.

The preamble sequence selected by the UE is used to differentiate UEs from each other that makes access at the same time. Collision handling is typically also present later on in the random access procedure. The selection of the preamble sequence can also be configured to make the UE to take the current estimated path loss and message size and coverage enhancements techniques into account when selecting a preamble.

Which preamble root sequences that should be used towards a specific radio base station is broadcast to the UE. For a handover, there can also be a dedicated random access enabled where the UE will use a specific preamble sequence that is not configured/used by any other UE at the same time. This is called contention free random access. To avoid that a neighbour base station uses the same set of root preamble sequences the preamble sequences are planned or automatically configured or calculated. If the preamble root sequences are unique between two base stations, then only the base station that matches the preamble sequence used by the UE for the first random access message will respond. The above is valid for LTE and, on a high level expected to be valid also for 5G or new Radio Access Technologies, RAT.

The use of unique preamble sequences between two neighbour base stations, i.e. these two base stations having different RACH configurations, will ensure that only the base station which the UE is intended to perform random access towards will respond. There will be a one-to-one mapping between random access request, from a certain UE, and random access reply from the base station which matches the preamble sequence. The preamble sequence is selected by the UE from the RACH configuration sent out by each base station, and typically the UE will choose the strongest one.

There is a drawback of the procedure as mentioned above in that it does not provide for robustness. That is, requests sent by the UE may get lost and are thus not received by a radio access node. In such a case, a lost request is sent again, by the UE. This time, the request is sent with a higher transmit power to make sure that the radio access node will receive the request, i.e. that the request will not get lost. This procedure is, however, cumbersome.

SUMMARY

It is an object to provide for a method of performing a random access procedure between a User Equipment UE, and a radio access network.

It is another object to provide for a first radio access node, a second radio access node as well as a UE for performing the random access procedure between the UE and the access network.

In a first aspect, there is provided a method of performing a random access procedure between a User Equipment, UE, and a radio access network, wherein said radio access network comprises two access nodes, wherein said two access nodes comprise different sets of signature sequences, wherein said signature sequences are used, by said access nodes, to differentiate requests coming from different UEs The method comprises the steps of receiving, by a first of said two access nodes, a random access request from said UE, wherein said random access request comprises a signature sequence, determining, by said first radio access node, that said random access request is intended for said first radio access node based on said signature sequence comprised by said request, receiving, by said first radio access node, from a second of said two access nodes, said random access request, thereby indicating that said second radio access node has also received said random access request from said UE, and sending, by said first radio access node, a response based on said received random access request from said UE and based on said random access request received from said second radio access node.

The method is at least based on the insight that it is advantageous in case the first radio access node is aware that the second radio access node has also received the random access request from the UE. This information is used, by the first base station, in sending the response to the UE and/or to the second base station. The presented method is advantageous as it, thus, provides diversity gain for the UE.

It is noted that, in accordance with the present disclosure, the set of signature sequences could comprise the Random-Access Channel, RACH, preamble sequences as used in Long Term Evolution, LTE, networks.

Here below, a basic principle of the random access procedure is explained in which the method may be implemented.

In a first step, a first message is sent by the UE towards the network. In order to do so, the UE may select one of a plurality of RACH preambles. The UE may also need to give its own identity to the network such that the network is able to address it in a subsequent step. The identity that the UE will use is typically called a Random access radio network temporary identity, i.e. a RA-RNTI. The RA-RNTI is usually determined from the time slot number in which the preamble is sent. In case the UE does not receive any feedback from the network, it assumes that the message is lost, and increases its power in fixed intervals and sends the message again.

In a second step, the access node, for example the access node, such as a Radio Base Station or eNodeB, sends a Random Access Response back to the UE on a particular downlink channel. The message may carry a temporary cell radio network temporary identity, temporary C-RNTI, for identifying the UE, as well as a timing advance value. The timing advance value is intended to inform the UE to change its timing so it can compensate for any round trip delay caused by UE distance from the access node.

In a third step, the UE sends a connection request message to the access node, wherein the UE is identified by the temporary cell radio network temporary identity.

In a fourth step, the access node responds with a contention resolution message towards the UE. This message typically comprises a cell radio network temporary identity which will be used for further communication with the UE.

It is noted that the advantages of the present disclosure are mainly disclosed in relation to the LTE network. The advantages are, however, also obtained in other types of networks.

It is noted that, in accordance with the present disclosure, the coverage area of the first radio access nodes overlaps with the coverage area of the second radio access node. The UE is located within the overlapping part of both coverage areas. As such, the request sent by the UE may be picked up, i.e. received, by the first radio access node as well as the second radio access node.

Further, the present disclosure is directed to the cooperation of two radio access nodes. It is noted that the same principle is applicable to even more radio access nodes, i.e. two or more radio access nodes.

In an example, the step of sending the response comprises one of sending a random access response, to said UE, wherein said random access response comprises an identity to be used for further communication between said UE and said first radio access node, and sending a request, to said second radio access node, requesting said second radio access node to respond to said UE based on said random access request.

The first radio access node is able to use the information received from the second radio access node to better detect that a random access request was sent to it. In other words, the received random access request, from the second radio access node aids in receiving, or recovering, the random access request received from the UE. The first radio access node could have problems in hearing the request from the UE and/or could avoid ghost accesses, etc. This example thus has the advantage that it improves the reliability of the random access procedure as there is an increased probability that the request from the UE is correctly received by the first radio access node.

As another option, the first radio access node directly responds to the second radio access node requesting the second radio access node to respond to the request sent by the UE. This option is, for example, used whenever the first radio access node has received the random access request from the UE erroneously, or with a poor signal to noise ratio, SNR. This also improves the reliability of the procedure, as in such a case, the second radio access node serves the UE. Would this not be the case, then the request from the UE would be lost, and the UE would need to send an additional random access request, most likely with an improved transmission power.

In a further example, the method further comprises at least one of the following steps:

sending, by said first radio access node, to said second radio access node, a first set of signature sequences used by said first radio access node to differentiate requests coming from different UEs to said first radio access node;

receiving, by said first radio access node, from said second radio access node, a second set of signature sequences used by said second radio access node to differentiate requests coming from different UEs to said second radio access node.

The example disclosed above enables each of the radio access nodes to be able to determine which radio access node was the intended receiver based on the received random access request from the UE. That is, a radio access node is able to determine, based on the signature sequence comprised in the request, which neighbouring radio access node was intended by the request, and is, subsequently, able to forward that received request to the intended radio access node. This is a clear advantage of the example over the prior art.

The information exchange between these radio access nodes may occur during start up, configuration or re-configuration of the radio access nodes.

Further, one of the advantages of this example is that the radio access nodes are aware of which signature sequences, for example preamble sequences, are used by the neighbouring access nodes, and that thus receive and transmit diversity is obtained. If a radio access node has issues in correctly receiving the random access request from the UE, then a neighbouring radio access node can help and improve the accessibility. The random access request from the UE may be erroneously received by the first radio access node due to, for example, a short disturbance in the radio spectrum or by pure coincidence in that two UEs used exactly the same signature sequence by accident.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the devices of the communication network.

In a second aspect, there is provided a method of performing a random access procedure between a User Equipment, UE, and a radio access network, wherein said radio access network comprises two access nodes, wherein said two access nodes comprise different sets of signature sequences, wherein said signature sequences are used, by said access nodes, to differentiate requests coming from different UEs.

The method comprises the steps of receiving, by a second of said two access nodes, a random access request from said UE, wherein said random access request comprises a signature sequence, determining, by said second radio access node, that said random access request is intended for said first radio access node based on said signature sequence comprises by said request, and sending, by said second radio access node, to said first radio access node, said random access request, thereby indicating that said second radio access node has also received said random access request from said UE.

The advantage of the above described method is that the first radio access node is made aware that the second radio access node has also received the random access request from the UE. This thus enables the first radio access node to act, i.e. to determine whether it is to send the random access response itself to the UE or whether the first radio access node is to send a request to the second radio access node to respond to the UE based on the random access request.

In case of a centralized Radio Access Network, a radio access node may be a combination of a radio function unit, referred to as Remote Radio Head base band unit, and a processor function, referred to as the Base Band Unit. Other splits of functionality of an access node may also be possible. It is also conceivable that the processor function operates in the cloud.

In an example, the method further comprises the steps of receiving, by said second radio access node, from said first radio access node, a request requesting said second radio access node to respond to said UE based on said random access request, and sending, by said second radio access node, a random access response, to said UE, wherein said random access response comprises an identity to be used for further communication between said UE and said second radio access node.

The above described example is directed to the situation in which the first radio access node determines that the second radio access node is to respond to the random access request. This decision can be based on a poorly, or erroneously, received random access request by the first radio access node, and/or on an overload condition of the first radio access node, and/or an incompatibility of the first radio access node for said random access request, etc. As such, the first radio access node sends a request to the second radio access node requesting the second radio access node to respond to the UE based on the random access request. The advantage of this example is that the UE is serviced better. That is, even if the first radio access node is not able to service the UE, then the second radio access node will service the UE. This assures that the UE is serviced more reliable.

In a further example, the method further comprises at least one of the following steps of sending, by said second radio access node, to said first radio access node, a second set of signature sequences used by said second radio access node to differentiate requests coming from different UEs to said second radio access node, and receiving, by said second radio access node, from said first radio access node, a first set of signature sequences used by said first radio access node to differentiate requests coming from different UEs to said first radio access node.

The above described examples is directed to the situation in which the set of signature sequences are made available to one of, or both of, the radio access nodes. In case a particular radio access node also has the possession of the sets of signature sequences of its neighbouring radio access nodes, it is able to determine which radio access node is the intended recipient for the random access request sent by the UE. The radio access node can correlate the signature sequence comprised by the request with all available sets of signature sequences to determine which radio access node was the intended receiver.

In a further example, the method further comprises the step of determining, by said second radio access node, that it will send a random access response to said UE, wherein said determination is based on at least one of a power at which said random access request is received from said UE, predefined rules relating to said second radio access node, and predefined rules relating to said first radio access node, and it comprises the step of sending, by said second radio access node, a random access response, to said UE, wherein said random access response comprises an identity to be used for further communication between said UE and said second radio access node.

The above described example is directed to the situation in which the second radio access nodes determines that it will send a response to the UE, irrespective of any orders and/or commands received from the first radio access node. This determination may be based on predefined agreements made between the first radio access node and the second radio access node. The advantage hereof is that the probability that the second radio access node is serviced more properly, is increased.

In case, for example, the signal-to-noise, SNR, ratio of the received request is above a predefined SNR threshold, the second radio access node may decide that it will send a random access response to the UE without first requesting the first radio access node to do so.

In a third aspect, there is provided a method of performing a random access procedure between a User Equipment, UE, and a radio access network, wherein said radio access network comprises two access nodes, wherein said two access nodes comprise different sets of signature sequences, wherein said signature sequences are used, by said access nodes, to differentiate requests coming from different UEs.

The method comprises the steps of sending, by said UE, a random access request from said UE, wherein said random access request comprises a signature sequence for a first of said two access nodes, and receiving, by said UE, a random access response, from a second of said two access nodes, wherein said random access response comprises an identity to be used for further communication between said UE and said second radio access node.

The above described example is directed to the method steps performed by a UE. In this situation, the UE sends a random access request towards the first radio access node. That is, the random access request comprises a signature sequence which is designated for the first radio access node. The UE, however, receives a random access response from a second radio access node. The random access response comprises an identity to be used for further communication between the UE and the second radio access node. The advantage of this example is that the UE is made suitable to deal with situations in which it sends a random access request to a first radio access node, but it receives a random access response for a second radio access node.

In an example, the method further comprises the steps of receiving, by said UE, a random access response, from said first radio access node, wherein said random access response comprises an identity to be used for further communication between said UE and said first radio access node, and selecting, by said UE, one of said two access nodes, for continuing with establishment of a connection to said selected access node, wherein said selection is based on said received random access response from said first radio access node and based on said received random access response from said second radio access node.

The above described example is directed to the situation in which the UE receives a random access response from the first radio access node as well as from the second radio access node. In this situation, the UE may select which of the two radio access nodes is to be chosen for continuing with establishment of a connection to the network.

The selection may, for example, be based on the received powers of the received random access responses from the first and the second radio access nodes. Another option is that the selection is made based on the timings of the received responses.

In a fourth aspect, there is provided a first radio access node operable to perform a random access procedure between a User Equipment, UE, and a radio access network, wherein said radio access network comprises said first radio access node and a second radio access node, wherein said two access nodes comprise different sets of signature sequences, wherein said signature sequences are used, by said access nodes, to differentiate requests coming from different UEs.

The first radio access node comprises receive equipment operable to receive a random access request from said UE, wherein said random access request comprises a signature sequence, and it comprises process equipment operable to determine that said random access request is intended for said first radio access node based on said signature sequence comprised by said request, wherein said receive equipment is further operable to receive, from said second radio access node, said random access request, thereby indicating that said second radio access node has also received said random access request from said UE, and the first radio access node further comprises transmit equipment operable to send a response based on said received random access request from said UE and based on said random access request received from said second radio access node.

In an example, the transmit equipment is further operable to send a random access response, to said UE, wherein said random access response comprises an identity to be used for further communication between said UE and said first radio access node, and/or sending a request, to said access node, requesting said second node to respond to said UE based on said random access request.

In a further example, the transmit equipment is further operable to send to said second radio access node, a first set of signature sequences used by said first radio access node to differentiate requests coming from different UEs to said first radio access node and/or wherein said receive equipment is further operable to receive from said second radio access node, a second set of signature sequences used by said second radio access node to differentiate requests coming from different UEs to said second radio access node.

In a fifth aspect, there is provided a second radio access node operable to perform a random access procedure between a User Equipment, UE, and a radio access network, wherein said radio access network comprises a first radio access node and said second radio access node, wherein said two access nodes comprise different sets of signature sequences, wherein said signature sequences are used, by said access nodes, to differentiate requests coming from different UEs.

The second radio access node comprises receive equipment operable to receive a random access request from said UE, wherein said random access request comprises a signature sequence, and it comprises process equipment operable to determine that said random access request is intended for said first radio access node based on said signature sequence comprises by said request, and it comprises transmit equipment operable to send to said first radio access node, said random access request, thereby indicating that said second radio access node has also received said random access request from said UE.

In an example, the receive equipment is further operable to receive from said first radio access node, a request requesting said second node to respond to said UE based on said random access request, and wherein said transmit equipment is further operable to send a random access response, to said UE, wherein said random access response comprises an identity to be used for further communication between said UE and said second radio access node.

In a further example, the transmit equipment is further operable to send, to said first radio access node, a second set of signature sequences used by said second radio access node to differentiate requests coming from different UEs to said second radio access node, and/or wherein said receive equipment is further operable to receive, from said first radio access node, a first set of signature sequences used by said first radio access node to differentiate requests coming from different UEs to said first radio access node.

In another example, the process equipment is further operable to determine that it will send a random access response to said UE, wherein said determination is based on at least one of a power at which said random access request is received from said UE, predefined rules relating to said second radio access node, predefined rules relating to said first radio access node, and for sending, by said second radio access node, a random access response, to said UE, wherein said random access response comprises an identity to be used for further communication between said UE and said second radio access node.

In a sixth aspect, there is provided a User Equipment, UE, operable to perform a random access procedure between said User Equipment, UE, and a radio access network, wherein said radio access network comprises two access nodes, wherein said two access nodes comprise different sets of signature sequences, wherein said signature sequences are used, by said access nodes, to differentiate requests coming from different UEs.

The UE comprises transmit equipment operable to send a random access request from said UE, wherein said random access request comprises a signature sequence for a first of said two access nodes, and receive equipment operable to receive a random access response, from a second of said two access nodes, wherein said random access response comprises an identity to be used for further communication between said UE and said second radio access node.

In an example, the receive equipment is further operable to receive a random access response, from said first radio access node, wherein said random access response comprises an identity to be used for further communication between said UE and said first radio access node, and wherein said UE further comprises select equipment operable to select one of said two access nodes, for continuing with establishment of a connection to said selected access node, wherein said selection is based on said received random access response from said first radio access node and based on said received random access response from said second radio access node.

In a seventh aspect, there is provided a non-transitory computer readable storage medium, comprising instructions which, when executed on at least one processor, cause the at least one processor to carry out the method according to any of the examples as disclosed above.

In an eight aspect, there is provided a first radio access node for performing a random access procedure between a User Equipment, UE, and a radio access network, wherein said radio access network comprises said first radio access node and a second radio access node, wherein said two access nodes comprise different sets of signature sequences, wherein said signature sequences are used, by said access nodes, to differentiate requests coming from different UEs The first radio access node comprises a receive module for receiving a random access request from said UE, wherein said random access request comprises a signature sequence, and it comprises a process module for determining that said random access request is intended for said first radio access node based on said signature sequence comprised by said request, wherein said receive module is for receiving, from said second radio access node, said random access request, thereby indicating that said second radio access node has also received said random access request from said UE. The first radio access node further comprising a transmit module for sending a response based on said received random access request from said UE and based on said random access request received from said second radio access node.

In a ninth aspect, there is provided a second radio access node for performing a random access procedure between a User Equipment, UE, and a radio access network, wherein said radio access network comprises a first radio access node and said second radio access node, wherein said two access nodes comprise different sets of signature sequences, wherein said signature sequences are used, by said access nodes, to differentiate requests coming from different UEs.

The second radio access node comprising a receive module for receiving a random access request from said UE, wherein said random access request comprises a signature sequence, and it comprises a process module for determining that said random access request is intended for said first radio access node based on said signature sequence comprises by said request, and it comprises a transmit module for sending to said first radio access node, said random access request, thereby indicating that said second radio access node has also received said random access request from said UE.

In a tenth aspect, there is provided a User Equipment, UE, for performing a random access procedure between said User Equipment, UE, and a radio access network, wherein said radio access network comprises two access nodes, wherein said two access nodes comprise different sets of signature sequences, wherein said signature sequences are used, by said access nodes, to differentiate requests coming from different UEs The UE comprising a transmit module for sending a random access request from said UE, wherein said random access request comprises a signature sequence for a first of said two access nodes, and it comprises a receive module for receiving a random access response, from a second of said two access nodes, wherein said random access response comprises an identity to be used for further communication between said UE and said second radio access node.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
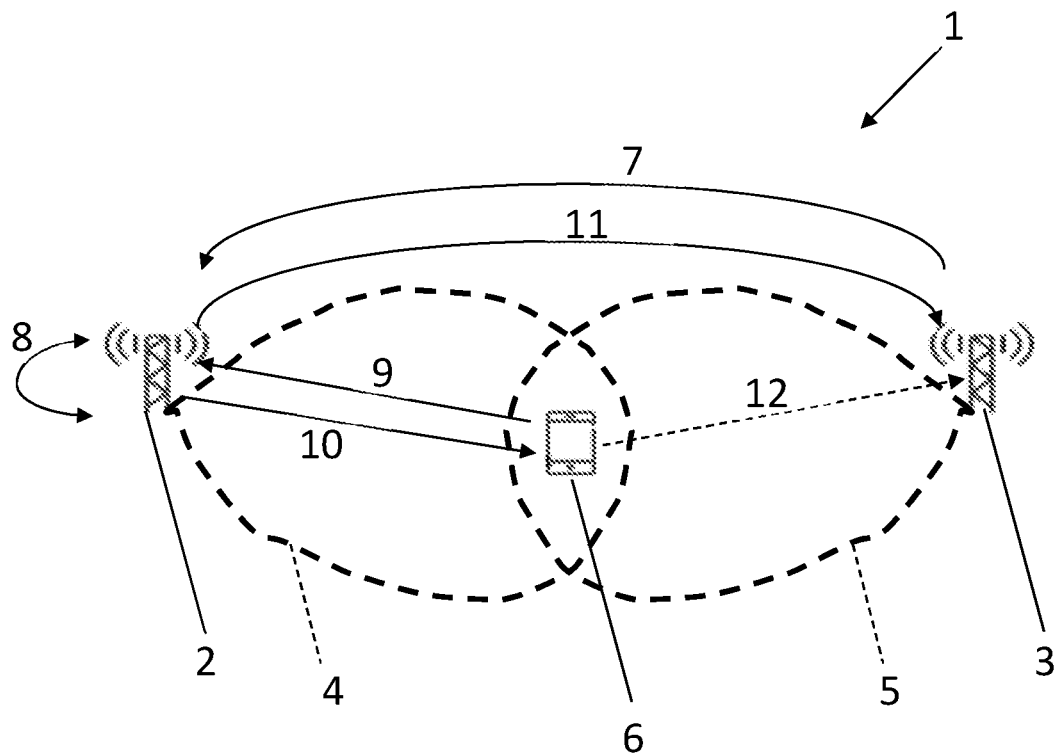
FIG. 1 is a schematic chart illustrating a basic aspect of the present disclosure.

FIG. 1 is a schematic chart 1 illustrating a basic aspect of the present disclosure. The present disclosure is set in a telecommunication network. According to the present invention, the telecommunication network comprises a radio access network as well as a core network. The radio access network is responsible for direct communication with User Equipment UEs, and for connecting the UEs to the core network. In order to do so, the radio access network comprises a plurality of radio access nodes, i.e. a first radio access node 2 and a second radio access node 3.

The access nodes 2, 3 may be Evolved Node B's, eNB's in an LTE network or NodeB's in an UMTS network or gNodeB's in a fifth Generation New Radio network. In case of a centralized Radio Access Network, a radio access node 2, 3 may be a combination of a radio function unit, referred to as Remote Radio Head base band unit, and a processor function, referred to as the Base Band Unit. Other splits of functionality of an access node may also be possible.

The chart 1 depicted in FIG. 1 discloses a method of performing a random access procedure between a UE 6 and a radio access network, more specifically between the UE 6 and at least one of the first radio access node 2 and the second radio access node 3. Here, the two radio access nodes 2, 3 comprise different sets of signature sequences, wherein the signature sequences are used to differentiate requests coming from different UEs.

A random access procedure typically takes place in the Medium Access Control, MAC, layer of, for example, the Long Term Evolution, LTE, network. Such a random access procedure is performed to complete a connection establishment procedure occurring in the Radio Resource Control, RRC, layer to change from an idle state to a connected state. Other uses of the random access procedure may be possible as well and are also covered by the present disclosure.

The first radio access node 2 has a coverage area indicated with reference numeral 4, and the second radio access node 3 has a coverage area indicated with reference numeral 5. The UE 6 is situated such that it is covered by both radio access nodes 2, 3, i.e. it is within the coverage area 4 of the first radio access node 2 and it is within the coverage area 5 of the second radio access node 3. As such, any transmission, i.e. any message sent by the UE 6, may be received by the first radio access node 2 as well as the second radio access node 3.

In a first step, the UE 6 sends 9 a random access request towards the first radio access node, wherein the random access request comprises a signature sequence destined for the first radio access node 2. The first radio access node 2 receives 9 the random access request. However, as depicted in the present figure, the same random access request sent by the UE 6 is also received by the second radio access node 3. This is depicted with reference numeral 12.

The first radio access node 2 is able to determine that it was the intended recipient for the request based on the signature sequence comprised by the request, for example the RACH preamble. That is, each radio access node has its own, unique, set of signature sequences such that, based on a differentiation of the sequence in the request, it can be determined which radio access node 2, 3 is the intended recipient for the request.

Typically, in the prior art situation, the radio access node will respond to the UE 6 with a random access response. In the particular situation, however, the first radio access node 2 receives 7, from the second radio access node 3 the radio access request thereby indicating that the second radio access node 3 has also received the random access request from the UE 6. This random access request may also be a compressed version, a similar version, or a translated version of the random access request. Key aspect is that the first radio access node 2 is able to determine that the second radio access node 3 has also received the same random access request from the UE 6.

Finally, based on the received random access request from the UE 6 and based on the random access request received from the second radio access node 3, the first radio access node 2 may send a response 10, 11.

The response 10, 11 could be a random access response sent 10 to the UE, wherein the random access response comprises an identity to be used for further communication between the UE 6 and the first radio access node 2. The response 10, 11 could also be a request sent 11 to the second radio access node 3 requesting the second radio access node 3 to respond to the UE 6 based on the random access request.

The response sent 11 to the second radio access node 3 could also, for example, be a response indicating that the second radio access node 3 does not need to respond to the random access request. This would mean that the first radio access node 2 will respond to the UE 6 directly itself. As mentioned above, the response sent 11 could also form a request requesting the second radio access node 3 to send the random access response to the UE 6. In this situation, the response could further comprise additional information with respect to the handling of the UE 6 in the telecommunication network. The first radio access node 2 could, for example, disclose any information it has concerning the UE 6 to the second radio access node 3 thereby aiding the second radio access node 3 in performing the random access procedure.

Figure 2:
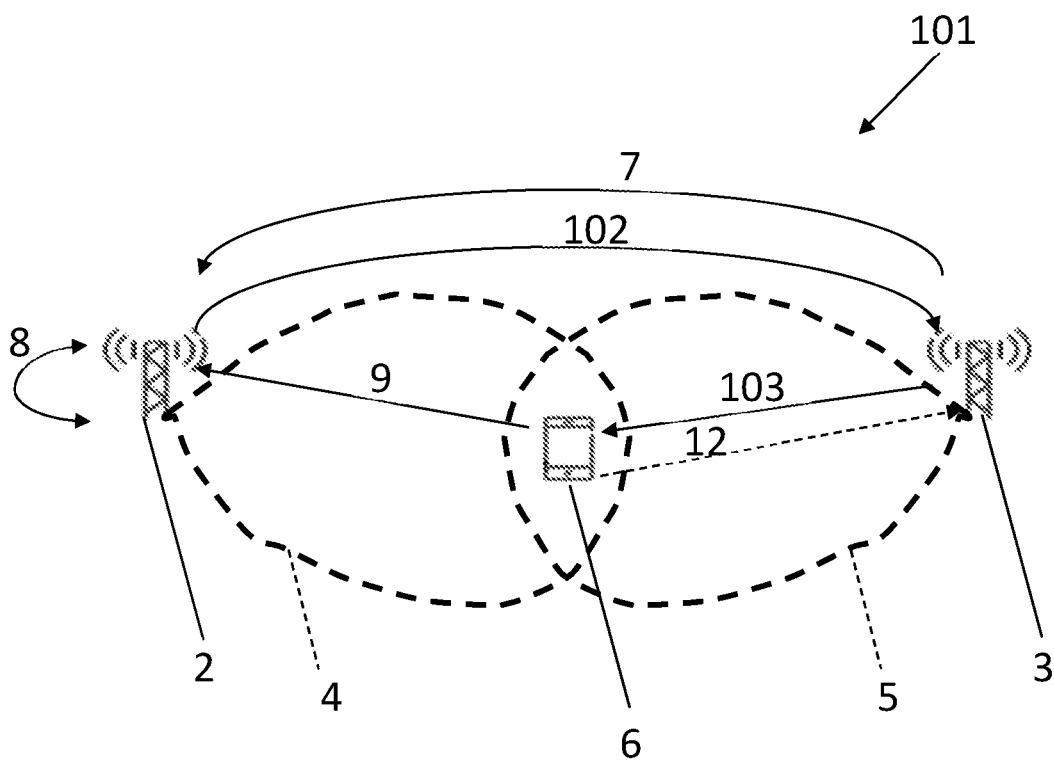
FIG. 2 is a schematic chart illustrating another aspect of the present disclosure.

According to the present disclosure, the signature sequence may be a Random Access CHannel, RACH, preamble in accordance with the Long Term Evolution, LTE. The total number of RACH preambles available in LTE is 64. These preambles are shared among UE for, for example, initial access and handover. Access to LTE networks can be classified based on the reservation or not of preambles for access. When UE have a reserved signature to access the system, they are said to be using Contention Free Random Access, CFRA. On the contrary, when users do not have a reserved signature for access they are said to use Contention Based Random Access. CFRA is typically used during handover. A number of the 64 preambles are normally reserved for handover only. The 64 preambles are not implicitly communicated to the UEs by the radio access node, i.e. eNodeB, but rather, the UE is informed about the process of how to generate them via parameters broadcast in SIB2. FIG. 2 is a schematic chart 101 illustrating another aspect of the present disclosure. It is noted that in the figures, aspects having the same or similar function are referenced to using the same reference numeral.

The situation depicted in FIG. 2 differs from the situation in FIG. 1 in that the first radio access node 2 decides that it will not sent a response to the UE 6 itself. The first radio access node 2 decides that the second radio access node 3 is to take up the random access request, i.e. the first radio access node 2 sends 102 a request to the second radio access node requesting the second radio access node 3 to reply 103 to the UE 6 with a random access response.

The decision of the first radio access node 2 that it will not send a reply itself to the UE 6 can be based on a received power of the random access request, a signal to noise, SNR, ratio of the received random access request, a capacity occupancy of the first radio access node 2, etc.

Once the second radio access node 3 has responded 103 to the UE 6 with a random access response, the process may continue with connecting the UE 6 to the telecommunication network. Here, the process continues with the UE 6 connecting to the second radio access node 3 instead of the, initially intended, first radio access node 2.

The presented method provides several advantages over the prior art. For example, it creates a possibility for diversity of the random access without sharing the same preamble sequences between access nodes. Further, it creates a possibility for the radio access network to understand which access node the UE intended to perform random access towards and can apply different rules based upon this when either sharing the information in the radio access network or when performing the random access response.

Figure 3:
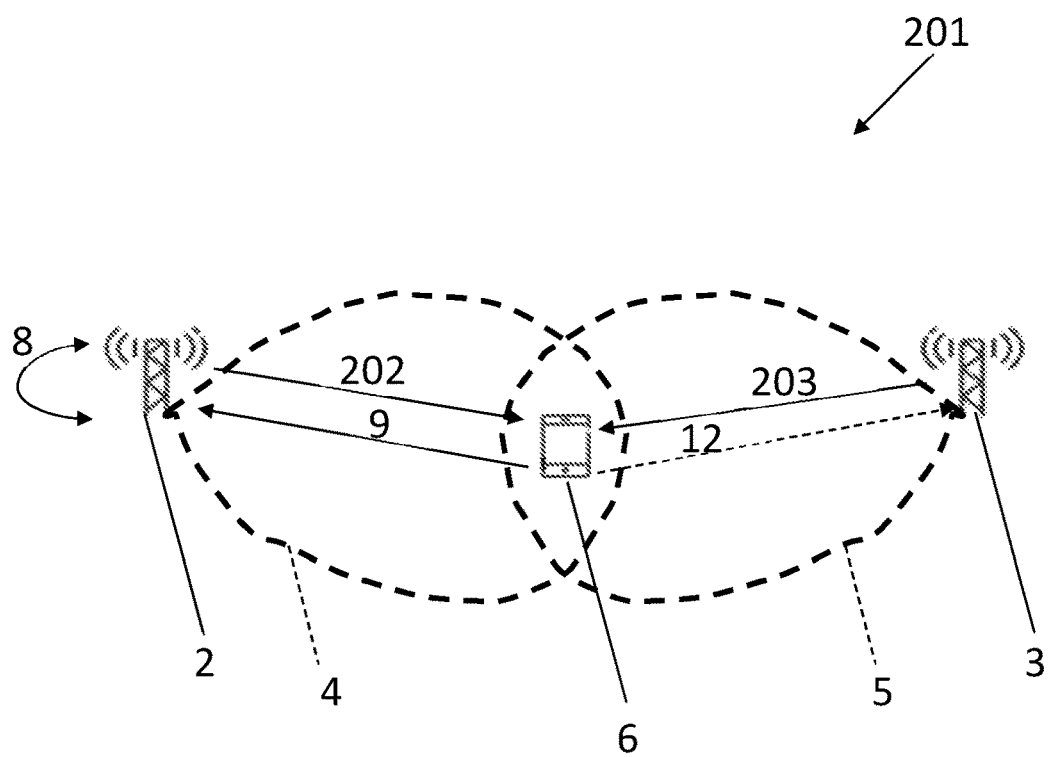
FIG. 3 is a schematic chart illustrating a further aspect of the present disclosure.

FIG. 3 is a schematic chart 201 illustrating a further aspect of the present disclosure.

The situation depicted in FIG. 3 differs from the situation in FIG. 1 and FIG. 2 in that the both radio access nodes 2, 3 send a random access response to the UE 6.

That is, the first radio access node 2 may not even know that the second radio access node 3 has also received the random access request from the UE 6. As such, the first radio access node 2 will sent 202 a random access response just like in prior art situations. However, the second radio access node 3 will also sent 203 a random access response to the UE 6.

In this particular situations, the UE 6 receives two responses: One from the first radio access node 2 and one from the second radio access node 3. The decision which radio access node 2, 3 the UE 6 should use is then up to the UE 6 itself. The decision could, for example, be based on the received powers of the received random access responses from the first radio access node 2 and the second radio access node 3.

It is noted that the second radio access node 3 may have decided to send 203 the random access response to the UE 6 based on any of a power at which the random access request is received from the UE 6, predefined rules relating to the second radio access node 3 and/or predefined rules relating to the first radio access node 2.

Figure 4:
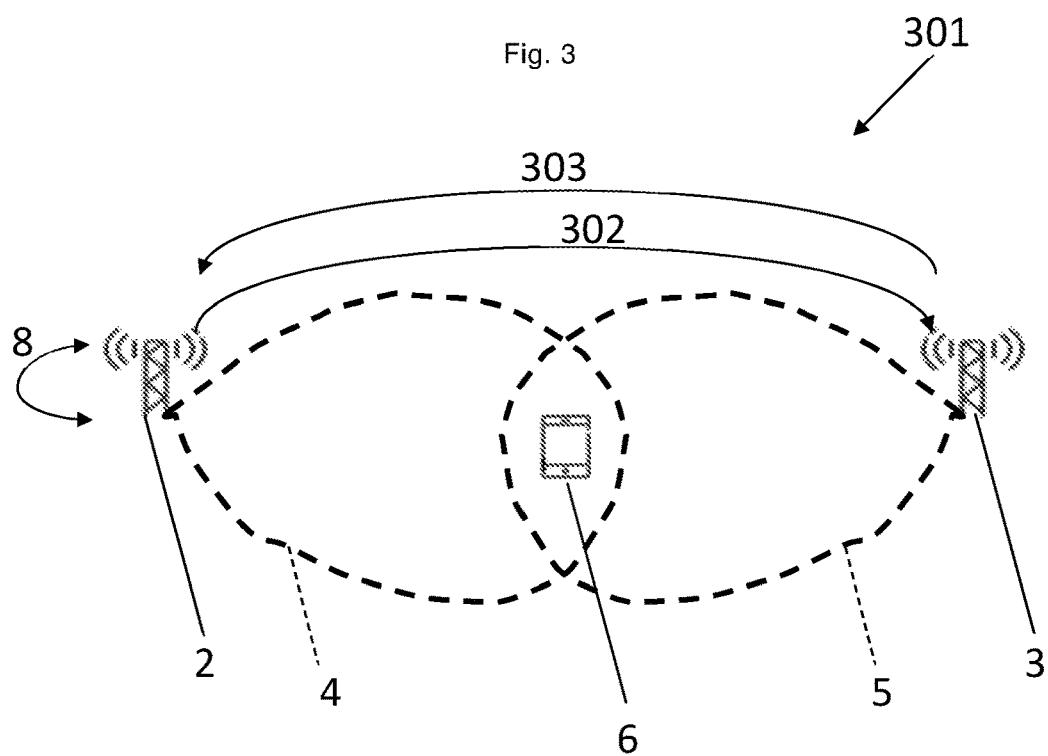
FIG. 4 is a schematic chart illustrating yet a further aspect of the present disclosure.

FIG. 4 is a schematic chart 301 illustrating yet a further aspect of the present disclosure.

This chart 301 shows a particular example in which the first radio access node 2 sends 303, to the second radio access node 3, a first set of signature sequences used by the first radio access node 2 to differentiate requests coming from different UEs to the first radio access node 2.

Further, it is shown that the second radio access node 3 also sends 302, to the first radio access node 2, a second set of signature sequences used by the second radio access node 3 to differentiate requests coming from different UEs to the second radio access node 3.

The above described examples enable the radio access nodes 2, 3 to determine which radio access node was the intended recipient for a random access request received from a UE 6.

Figure 5:
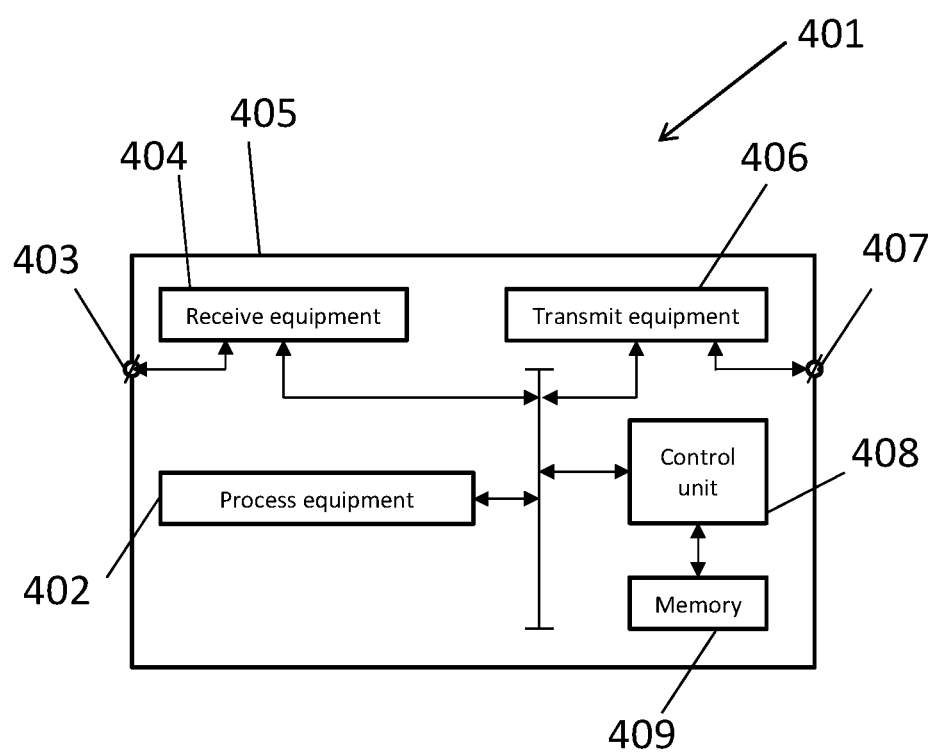
FIG. 5 is a schematic chart illustrating an embodiment of a first radio access node.

FIG. 5 is a schematic chart 401 illustrating an embodiment of a first radio access node 405.

A first radio access node 401 operable to perform a random access procedure between a User Equipment, UE, and a radio access network, wherein said radio access network comprises said first radio access node 401 and a second radio access node, wherein said two access nodes comprise different sets of signature sequences, wherein said signature sequences are used, by said access nodes, to differentiate requests coming from different UEs.

The first radio access node 401 comprises receive equipment 404 operable to receive a random access request from said UE, wherein said random access request comprises a signature sequence. Further, process equipment 402 is provided which is operable to determine that said random access request is intended for said first radio access node based on said signature sequence comprised by said request.

The receive equipment 404 is further operable to receive, from said second radio access node, said random access request, thereby indicating that said second radio access node has also received said random access request from said UE;

The first radio access node 405 further comprises transmit equipment 406 operable to send a response based on said received random access request from said UE and based on said random access request received from said second radio access node.

Here, incoming data packets, or messages, pass through the input terminal 403 before they reach the receive equipment 404, or receiving module. Outgoing data packets or messages pass or are sent by the transmit equipment 406, or transmit module, via the output terminal 407.

The first radio access node 405 further comprises a control unit 408 and a memory 409, which control unit 408 is connected to the receive equipment 404, the transmit equipment 406 and the process equipment 402 via a bus connection or the like.

In an example, the present disclosure is thus directed to a first radio access node operable to perform a random access procedure between a User Equipment, UE, and a radio access network, wherein said radio access network comprises said first radio access node and a second radio access node, wherein said two access nodes comprise different sets of signature sequences, wherein said signature sequences are used, by said access nodes, to differentiate requests coming from different UEs, said first radio access node comprising:
  a receive module to receive a random access request from said UE, wherein said random access request comprises a signature sequence;
  a process module to determine that said random access request is intended for said first radio access node based on said signature sequence comprised by said request;
  wherein said receive module is further to receive, from said second radio access node, said random access request, thereby indicating that said second radio access node has also received said random access request from said UE;
  said first radio access node further comprising:
  a transmit module to send a response based on said received random access request from said UE and based on said random access request received from said second radio access node.

Figure 6:
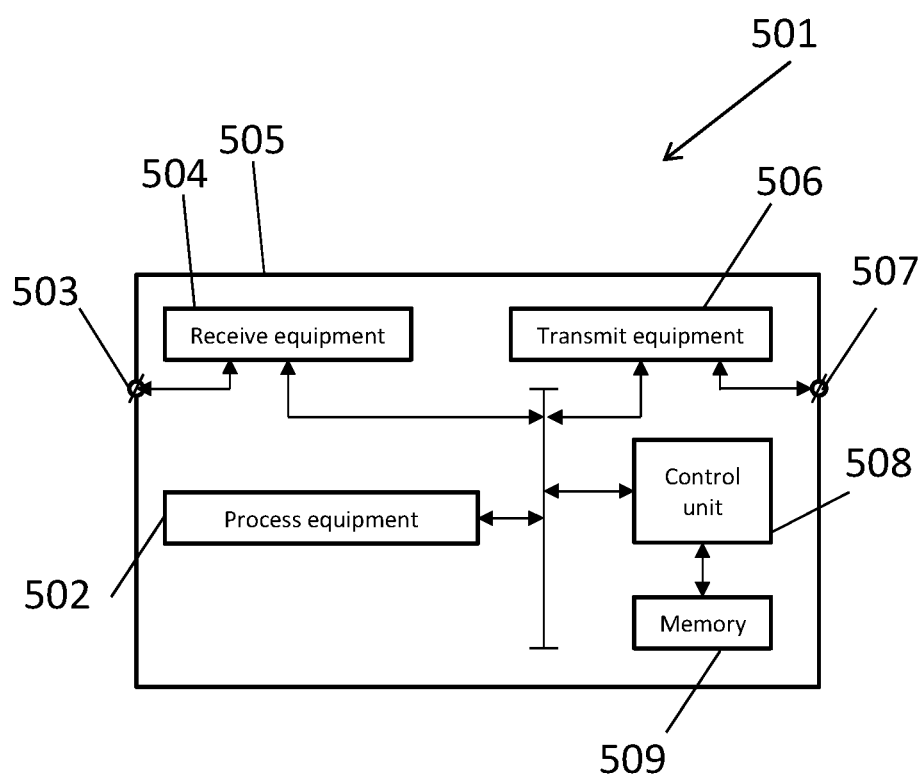
FIG. 6 is a schematic chart illustrating an embodiment of a second radio access node.

FIG. 6 is a schematic chart 501 illustrating an embodiment of a second radio access node 505.

The second radio access node 505 is operable to perform a random access procedure between a User Equipment, UE, and a radio access network, wherein said radio access network comprises a first radio access node and said second radio access node 505, wherein said two access nodes comprise different sets of signature sequences, wherein said signature sequences are used, by said access nodes, to differentiate requests coming from different UEs.

The second radio access node 505 comprises receive equipment 504 operable to receive a random access request from said UE, wherein said random access request comprises a signature sequence, and comprises process equipment 502 operable to determine that said random access request is intended for said first radio access node 505 based on said signature sequence comprises by said request and it comprises transmit equipment 506 operable to send to said first radio access node, said random access request, thereby indicating that said second radio access node 505 has also received said random access request from said UE.

Here, incoming data packets, or messages, pass through the input terminal 503 before they reach the receive equipment 504, or receiving module. Outgoing data packets or messages pass or are sent by the transmit equipment 506, or transmit module, via the output terminal 507.

The first radio access node 505 further comprises a control unit 508 and a memory 509, which control unit 508 is connected to the receive equipment 504, the transmit equipment 506 and the process equipment 502 via a bus connection or the like.

In an example, the present disclosure is directed to a second radio access node operable to perform a random access procedure between a User Equipment, UE, and a radio access network, wherein said radio access network comprises a first radio access node and said second radio access node, wherein said two access nodes comprise different sets of signature sequences, wherein said signature sequences are used, by said access nodes, to differentiate requests coming from different UEs, said second radio access node comprising:
  receive module to receive a random access request from said UE, wherein said random access request comprises a signature sequence;
  process module to determine that said random access request is intended for said first radio access node based on said signature sequence comprises by said request;
  transmit module to send to said first radio access node, said random access request, thereby indicating that said second radio access node has also received said random access request from said UE.

Figure 7:
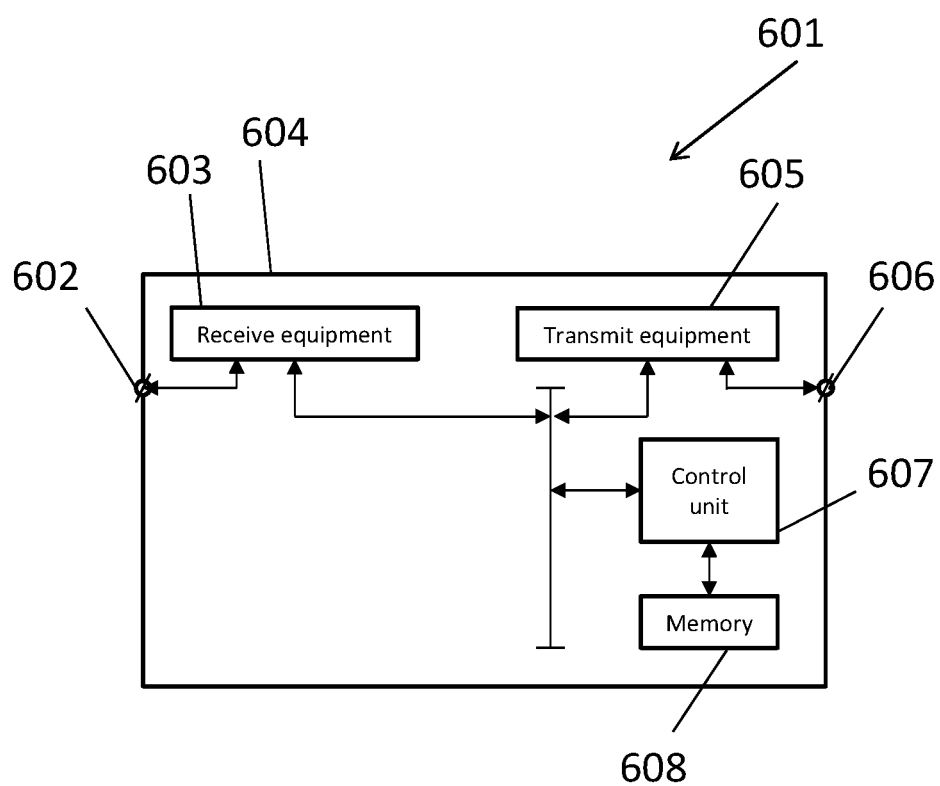
FIG. 7 is a schematic chart illustrating an embodiment of a User Equipment, UE.

FIG. 7 is a schematic chart 601 illustrating an embodiment of a User Equipment, UE 604.

The User Equipment 604 is operable to perform a random access procedure between said User Equipment, UE, 604 and a radio access network, wherein said radio access network comprises two access nodes, wherein said two access nodes comprise different sets of signature sequences, wherein said signature sequences are used, by said access nodes, to differentiate requests coming from different UEs The UE 604 comprises transmit equipment 605 operable to send a random access request from said UE 604, wherein said random access request comprises a signature sequence for a first of said two access nodes, and it comprises receive equipment 603 operable to receive a random access response, from a second of said two access nodes, wherein said random access response comprises an identity to be used for further communication between said UE and said second radio access node.

In an example, the present disclosure is directed to a User Equipment operable to perform a random access procedure between said User Equipment, UE, and a radio access network, wherein said radio access network comprises two access nodes, wherein said two access nodes comprise different sets of signature sequences, wherein said signature sequences are used, by said access nodes, to differentiate requests coming from different UEs, said UE comprising:
  transmit module to send a random access request from said UE, wherein said random access request comprises a signature sequence for a first of said two access nodes;
  receive module to receive a random access response, from a second of said two access nodes, wherein said random access response comprises an identity to be used for further communication between said UE and said second radio access node.

Figure 8:
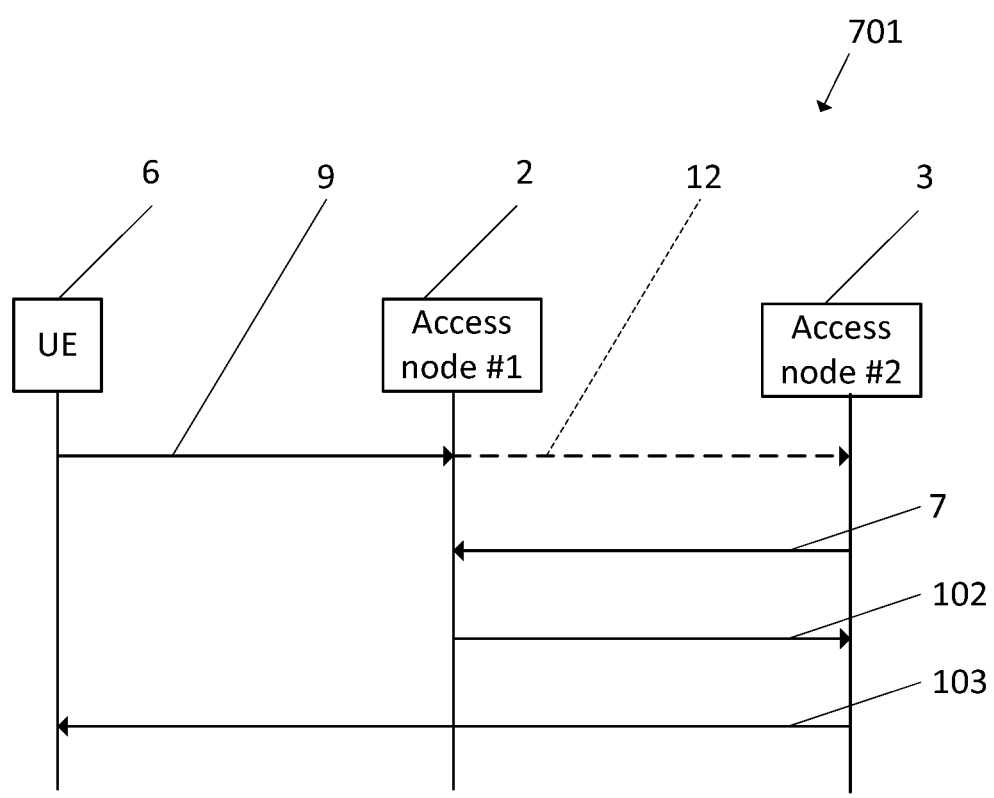
FIG. 8 is a signalling diagram illustrating an aspect of the present disclosure.

FIG. 8 is a signalling diagram 701 illustrating an aspect of the present disclosure.

The signalling diagram 701 depicts the signalling between the UE 6, the first radio access node 2 and the radio access node 3 as described in the text accompanying FIG. 2.

Here, the random access request is received 9 by the first radio access node 2 and is received 12 by the second radio access node 3. The arrows indicated with reference numerals 9 and 12 are drawn in the extend of each other to indicate that it is the same message that is received by the two radio access nodes 2, 3.

In this particular situation, the first radio access node 2 decides that the second radio access node 3 is to take up the random access request, i.e. the first radio access node 2 sends 102 a request to the second radio access node requesting the second radio access node 3 to reply 103 to the UE 6 with a random access response.

The decision of the first radio access node 2 that it will not send a reply itself to the UE 6 is, for example, based on a received power of the random access request, a signal to noise, SNR, ratio of the received random access request, a capacity occupancy of the first radio access node 2, etc. For example, in case the SNR of the received random access request is below a predefined threshold, the first radio access node 2 may decide that it will not take up on the request and will request the second radio access node to sent out the response to the UE 6.

As mentioned before, the first radio access node 2 may decide whether to respond to the request from the UE 6 itself, or whether to request the second radio access node 3 to respond to the request from the UE 6. This decision could also be made based on a recorded, or known, location behavior of that particular UE 6. That is, if, for example, it is known that the UE 6 is usually served by the second radio access node 3, it may be wise to request the second radio access node 3 to also take on the current request from the UE 6. This could indicate, for example, that the UE 6 is normally within the coverage area of the second radio access node 3. As such, it is considered likely that the UE 6 travels back again from the "overlapping coverage area" of both radio access nodes 2, 3 to a location which is only covered by the second radio access node 3. This would prevent an additional handover to be performed between the first radio access node 2 and the second radio access node 3

One of the advantages of the present disclosure is that the UE 6 is handled more reliable. That is, the UE 6 is still served properly even in situations that the first radio access node 2 is not able to, or is not properly able to, serve the UE 6. In such a situation, the second radio access node 3 may take over, and serve the UE 6.

Another advantage is that the random access request received by the first radio access node 2, from the second radio access node 3, can help in correctly receiving the same request directly from the UE 6. The request received from the second radio access node 3 can, for example, serve as a redundancy check or as fault repair code. This improves the likelihood that the first radio access node 2 is able to correctly receive the request, and it thus improves the likelihood that the UE 6 gets served properly.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the embodiments as disclosed above, and can be modified and enhances by those skilled in the art beyond the scope of the present disclosure as disclosed in the appended claims without having to apply inventive skills.

The invention claimed is:

1. A method of performing a random access procedure between a User Equipment (UE) and a radio access network, wherein said radio access network comprises two radio access nodes that use different sets of signature sequences to differentiate random access requests coming from different UEs, said method comprising:
  receiving, by a first of said two radio access nodes, a random access request from said UE, wherein said random access request comprises a signature sequence;
  determining, by said first radio access node, that said random access request is intended for said first radio access node based on said signature sequence comprised by said random access request;
  receiving, by said first radio access node, from a second of said two radio access nodes, said random access request, thereby indicating that said second radio access node has also received said random access request from said UE; and
  sending, by said first radio access node, a response based on said random access request received from said UE and based on said random access request received from said second radio access node.

2. The method according to claim 1, wherein said sending said response comprises one of:
  sending a random access response to said UE, wherein said random access response comprises an identity to be used for further communication between said UE and said first radio access node; and
  sending a request to said second radio access node, requesting said second radio access node to respond to said UE based on said random access request.

3. The method according to claim 1, wherein said method further comprises at least one of the following:
  sending, by said first radio access node, to said second radio access node, a first set of signature sequences used by said first radio access node to differentiate random access requests coming from different UEs to said first radio access node; and
  receiving, by said first radio access node, from said second radio access node, a second set of signature sequences used by said second radio access node to differentiate random access requests coming from different UEs to said second radio access node.

4. A method of performing a random access procedure between a User Equipment (UE) and a radio access network, wherein said radio access network comprises two radio access nodes that use different sets of signature sequences to differentiate random access requests coming from different UEs, said method comprising:
receiving, by a second of said two radio access nodes, a random access request from said UE, wherein said random access request comprises a signature sequence;
determining, by said second radio access node, that said random access request is intended for said first radio access node based on said signature sequence comprised by said random access request; and
sending, by said second radio access node, to said first radio access node, said random access request, thereby indicating that said second radio access node has also received said random access request from said UE.

5. The method according to claim 4, wherein said method further comprises:
receiving, by said second radio access node, from said first radio access node, a request requesting said second radio access node to respond to said UE based on said random access request; and
sending, by said second radio access node, a random access response, to said UE, wherein said random access response comprises an identity to be used for further communication between said UE and said second radio access node.

6. The method according to claim 4, wherein said method further comprises at least one of the following:
sending, by said second radio access node, to said first radio access node, a second set of signature sequences used by said second radio access node to differentiate random access requests coming from different UEs to said second radio access node; and
receiving, by said second radio access node, from said first radio access node, a first set of signature sequences used by said first radio access node to differentiate random access requests coming from different UEs to said first radio access node.

7. The method according to claim 4, wherein said method further comprises:
determining, by said second radio access node, that said second radio access node will send a random access response to said UE, wherein said determination is based on at least one of:
a power at which said random access request is received from said UE;
predefined rules relating to said second radio access node; and
predefined rules relating to said first radio access node; and
sending, by said second radio access node, a random access response to said UE, wherein said random access response comprises an identity to be used for further communication between said UE and said second radio access node.

8. A method by a User Equipment (UE) of performing a random access procedure between the UE and a radio access network, wherein said radio access network comprises first and second radio access nodes that use different sets of signature sequences to differentiate random access requests coming from different UEs, said method comprising:

sending a random access request from said UE, wherein said random access request comprises a signature sequence for the first radio access node;
responsive to receiving a single random access response sent from a single responding one of the first and second radio access nodes in reply to the random access request, continuing the random access procedure towards the single responding radio access node, using an identifier and timing advance value provided in the single random access response; and
responsive to receiving two random access responses, each sent by a respective one of the first and second radio access nodes in reply to the random access request, selecting one of the first and second radio access nodes as a selected radio access node, in dependence on evaluating the two random access responses, and continuing the random access procedure towards the selected radio access node, using an identifier and timing advance value provided in the random access response that was received from the selected radio access node.

9. The method according to claim 8, wherein selecting one of the first and second radio access nodes comprises:
selecting one of the first and second radio access nodes based on received powers of the two random access responses.

10. A first radio access node configured to perform a random access procedure between a User Equipment (UE) and a radio access network, wherein said radio access network comprises said first radio access node and a second radio access node, wherein said two radio access nodes use different sets of signature sequences to differentiate random access requests coming from different UEs, said first radio access node comprising:
communication circuitry configured for communicating with said UE and said second radio access node; and
processing circuitry operatively associated with said communication circuitry and configured to:
receive a random access request from said UE via said communication circuitry, wherein said random access request comprises a signature sequence;
determine that said random access request is intended for said first radio access node based on said signature sequence comprised by said random access request;
receive, from said second radio access node, said random access request, thereby indicating that said second radio access node has also received said random access request from said UE; and
send a response, via said communication circuitry, based on said random access request received from said UE and based on said random access request received from said second radio access node.

11. The first radio access node according to claim 10, wherein said processing circuitry is configured to perform one of:
send a random access response to said UE, wherein said random access response comprises an identity to be used for further communication between said UE and said first radio access node; and
send a request, to said second radio access node, requesting said second radio access node to respond to said UE based on said random access request.

12. The first radio access node according to claim 10, wherein said processing circuitry is configured to perform one of:

send, to said second radio access node, a first set of signature sequences used by said first radio access node to differentiate random access requests coming from different UEs to said first radio access node; and receive, from said second radio access node, a second set of signature sequences used by said second radio access node to differentiate random access requests coming from different UEs to said second radio access node.

13. A second radio access node configured to perform a random access procedure between a User Equipment (UE) and a radio access network, wherein said radio access network comprises a first radio access node and said second radio access node, wherein said two radio access nodes use different sets of signature sequences to differentiate random access requests coming from different UEs, said second radio access node comprising:

communication circuitry configured for communicating with said UE and said first radio access node; and processing circuitry operatively associated with said communication circuitry and configured to:

receive a random access request from said UE via said communication circuitry, wherein said random access request comprises a signature sequence;

determine that said random access request is intended for said first radio access node based on said signature sequence comprised by said random access request; and send to said first radio access node via said communication circuitry, said random access request, thereby indicating that said second radio access node has also received said random access request from said UE.

14. The second radio access node according to claim 13, wherein said processing circuitry is configured to:

receive from said first radio access node, a request requesting said second radio access node to respond to said UE based on said random access request; and send a random access response to said UE, wherein said random access response comprises an identity to be used for further communication between said UE and said second radio access node.

15. The second radio access node according to claim 13, wherein said processing circuitry is configured to perform one of:

send, to said first radio access node, a second set of signature sequences used by said second radio access node to differentiate random access requests coming from different UEs to said second radio access node; and receive, from said first radio access node, a first set of signature sequences used by said first radio access node to differentiate random access requests coming from different UEs to said first radio access node.

16. The second radio access node according to claim 13, wherein said processing circuitry is configured to:

determine that said second radio access node will send a random access response to said UE, wherein said determination is based on at least one of:

a power at which said random access request is received from said UE;

predefined rules relating to said second radio access node; and predefined rules relating to said first radio access node; and sending, by said second radio access node, a random access response to said UE, wherein said random access response comprises an identity to be used for further communication between said UE and said second radio access node.

17. A User Equipment (UE) configured to perform a random access procedure between said UE and a radio access network, wherein said radio access network comprises first and second radio access nodes that use different sets of signature sequences to differentiate random access requests coming from different UEs, said UE comprising:

communication circuitry configured for communicating with said two radio access nodes; and processing circuitry operatively associated with said communication circuitry and configured to:

send a random access request from said UE via said communication circuitry, wherein said random access request comprises a signature sequence for the first radio access node;

responsive to receiving a single random access response sent from a single responding one of the first and second radio access nodes in reply to the random access request, continue the random access procedure towards the single responding radio access node, using an identifier and timing advance value provided in the single random access response; and responsive to receiving two random access responses, each sent by a respective one of the first and second radio access nodes in reply to the random access request, select one of the first and second radio access nodes as a selected radio access node, in dependence on evaluating the two random access responses, and continue the random access procedure towards the selected radio access node, using an identifier and timing advance value provided in the random access response that was received from the selected radio access node.

18. A non-transitory computer readable storage medium storing a computer program for performing a random access procedure between a User Equipment (UE) and a radio access network, wherein said radio access network comprises two radio access nodes that use different sets of signature sequences to differentiate random access requests coming from different UEs, the computer program comprising instructions that, when executed on at least one processor of a first of said two radio access nodes, cause the at least one processor to:

receive a random access request from said UE, wherein said random access request comprises a signature sequence;

determine that said random access request is intended for said first radio access node based on said signature sequence comprised by said request;

receive, from a second of said two radio access nodes, said random access request, thereby indicating that said second radio access node has also received said random access request from said UE; and send a response based on said random access request received from said UE and based on said random access request received from said second radio access node.

19. A non-transitory computer readable storage medium storing a computer program for performing a random access procedure between a User Equipment (UE) and a radio access network, wherein said radio access network comprises two radio access nodes that use different sets of signature sequences to differentiate random access requests coming from different UEs, the computer program comprising instructions that, when executed on at least one processor of a second of said two radio access nodes, cause the at least one processor to:
- receive a random access request from said UE, wherein said random access request comprises a signature sequence;
- determine that said random access request is intended for said first radio access node based on said signature sequence comprised by said random access request; and
- send, to said first radio access node, said random access request, thereby indicating that said second radio access node has also received said random access request from said UE.

20. A non-transitory computer readable storage medium storing a computer program for performing a random access procedure between a User Equipment (UE) and a radio access network, wherein said radio access network comprises first and second radio access nodes that use different sets of signature sequences to differentiate random access requests coming from different UEs, the computer program comprising instructions that, when executed on at least one processor of said UE, cause the at least one processor to:

send a random access request, wherein said random access request comprises a signature sequence for the first radio access node;

responsive to receiving a single random access response sent from a single responding one of the first and second radio access nodes in reply to the random access request, continue the random access procedure towards the single responding radio access node, using an identifier and timing advance value provided in the single random access response; and responsive to receiving two random access responses, each sent by a respective one of the first and second radio access nodes in reply to the random access request, select one of the first and second radio access nodes as a selected radio access node, in dependence on evaluating the two random access responses, and continue the random access procedure towards the selected radio access node, using an identifier and timing advance value provided in the random access response that was received from the selected radio access node.

* * * * *

UNITED STATES PATENT AND TRADEMARK OFFICE
CERTIFICATE OF CORRECTION

PATENT NO. : 10,412,768 B2  
APPLICATION NO. : 15/524171  
DATED : September 10, 2019  
INVENTOR(S) : Axen et al.

It is certified that error appears in the above-identified patent and that said Letters Patent is hereby corrected as shown below:

In the Specification

In Column 13, Line 1, delete "first radio access node 401" and insert -- first radio access node 405 --, therefor.

In Column 13, Line 4, delete "first radio access node 401" and insert -- first radio access node 405 --, therefor.

In Column 13, Line 9, delete "first radio access node 401" and insert -- first radio access node 405 --, therefor.

Signed and Sealed this  
First Day of September, 2020

Andrei Iancu  
*Director of the United States Patent and Trademark Office*